(12) United States Patent
Yajnik et al.

(10) Patent No.: US 12,260,291 B1
(45) Date of Patent: Mar. 25, 2025

(54) SYSTEMS AND METHODS FOR TRACKING ACTIONS USING VISUALLY SCANNABLE CODES

(71) Applicant: Capital One Services, LLC, McLean, VA (US)

(72) Inventors: Sanjiv Yajnik, McLean, VA (US); Satyajit Sajanrao Nalavade, McKinney, TX (US); Sunil Raste, Plano, TX (US); Eddie Provencio, Coppell, TX (US); Vikramaditya Repaka, Coppell, TX (US); John Patrick Eckman, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 18/506,679

(22) Filed: Nov. 10, 2023

(51) Int. Cl.
*G06K 7/14* (2006.01)

(52) U.S. Cl.
CPC .......... *G06K 7/1417* (2013.01); *G06K 7/146* (2013.01)

(58) Field of Classification Search
CPC .............................. G06K 7/1417; G06K 7/146
See application file for complete search history.

(56) References Cited

U.S. PATENT DOCUMENTS

2020/0402622 A1* 12/2020 Ishmael ................. G06Q 50/22

* cited by examiner

*Primary Examiner* — Matthew Mikels
(74) *Attorney, Agent, or Firm* — Foley & Lardner LLP

(57) ABSTRACT

Methods and systems disclosed herein enable tracking user actions by generating different visually scannable codes (e.g., QR codes) for combinations of user, operator, and action(s). Each visually scannable code may be stored with user action data and an operator identifier and linked to another visually scannable code corresponding to the user. When a visually scannable code is scanned, all data associated with the visually scannable code and data associated with other linked visually scannable codes is generated for display. By generating the visually scannable codes and storing the codes in a linked state, the system is able to provide quick and efficient data retrieval.

19 Claims, 7 Drawing Sheets

200

| Action Data 202 | Operator Identifier 204 |
|---|---|
| <Description> | <Identification Data> |

| Action Data 302 | Operator Identifier 304 | Visually Scannable Code 306 |
|---|---|---|
| <Identification Data> | <Identification Data> |  |

| User Identifier 502 | Action Data 504 | Operator Identifier 506 | Visually Scannable Code 508 |
|---|---|---|---|
| <Identification Data for User 1> | <Identification Data For a First Action> | <Identification Data for Operator 1> |  |
| <Identification Data for User 1> | <Identification Data For a First Action> | <Identification Data for Operator 2> |  |

500

510

512

SYSTEMS AND METHODS FOR TRACKING ACTIONS USING VISUALLY SCANNABLE CODES

BACKGROUND

In recent years, the use of visually scannable codes (e.g., quick-response (QR) codes) for various applications has exponentially increased. Visually scannable codes (e.g., QR codes) may be two-dimensional codes that may store a wide range of information, including textual information, graphical information, and/or other suitable information. Visually scannable codes may be easily generated and displayed using various media formats, such as print materials, digital screens, and packaging. Users may scan visually scannable codes using smartphones or dedicated scanners, which allows them to instantly access the associated information. Currently, these codes are used in various ways, for example, to exchange contact information.

SUMMARY

Another way visually scannable codes may be used is to track training schedules and performance for elite athletes. For example, many athletes may have multiple trainers and/or coaches, and it may be difficult to track various activities during each training session with each coach. In some instances, a particular trainer may work with multiple athletes or clients and may desire to keep track of different activities during the training sessions. By using visually scannable codes, users are able to quickly and efficiently track progress with each operator. Accordingly, a mechanism is disclosed that would allow users to track and manage their individual actions with multiple operators in pursuit of a specific routine. One mechanism to allow users to track their routines includes utilizing visually scannable codes (e.g., QR codes) to track a combination of the user (e.g., an athlete), operator (e.g., a trainer), and one or more actions. As one example, methods and systems are described herein for tracking a user's training routines with multiple trainers. Various existing systems allow tracking of training routines. However, quick, efficient access to training data by multiple parties (e.g., multiple trainers and users) is often difficult. To overcome this and other issues, methods and systems disclosed herein enable tracking user actions by generating different visually scannable codes (e.g., QR codes) for combinations of user, operator, and action(s). Each visually scannable code may be stored with user action data and an operator identifier and linked to another visually scannable code corresponding to the user. By generating the visually scannable codes and storing the codes in this manner, the system is able to provide quick and efficient data retrieval for each party.

In some aspects, the problems described above may be solved using a tracking system that may perform the following operations. The tracking system may receive a first request to generate a first visually scannable code. In particular, the tracking system may receive a first request to generate a first visually scannable code encoding a first action associated with both a user and a first operator. The first request may include first action data describing the first action. For example, a first trainer may use his or her smartphone and may transmit a request, to the tracking system, to generate a QR code when an athlete performs an exercise routine with that trainer. The routine may have one or more actions.

The tracking system may generate a visually scannable code to represent the training routine that was performed. In particular, in response to the first request, the tracking system may generate the first visually scannable code and store the first action data, a first operator identifier of the first operator, and the first visually scannable code. The first visually scannable code may embed an identifier that enables retrieving the first action data and second action data associated with the user. For example, the tracking system may generate a first QR code after receiving the request from the trainer's computing device. The tracking system may store the routine data, a unique identifier for the first trainer, and the first QR code together in a database. The first QR code may include a user identifier for the athlete.

The tracking system may receive a second request to generate another visually scannable code for another training routine. In particular, the tracking system may receive a second request to generate a second visually scannable code representing a second action associated with both the user and a second operator. The second request may include the second action data describing the second action. For example, a second trainer may use his or her electronic tablet to transmit a request, to the tracking system, to generate a QR code when the athlete starts a routine with the second trainer.

The tracking system may generate the second visually scannable code. In particular, in response to the second request, the tracking system may generate the second visually scannable code and store the second action data, a second operator identifier of the second operator, and the second visually scannable code. The second visually scannable code may embed the identifier that enables retrieving the first action data and the second action data. For example, the tracking system may generate a second QR code after receiving the request from the second trainer. The tracking system may store the routine data, a unique identifier for the second trainer, and the second QR code together in a database. The second QR code may also include the same user identifier for the same athlete.

The tracking system may generate for display the first action data and the second action data. In particular, in response to determining that the first visually scannable code has been detected or the second visually scannable code has been detected, the tracking system may generate for display the first action data and the second action data. For example, a user device may display text or a graphic representing the first action and another text or graphic representing a second action when those actions are identified in response to scanning a QR code. In some embodiments, the athlete's smartphone may display an icon representing the first action and another icon representing the second action after scanning the QR code on a trainer's card or smartphone.

In some embodiments, the tracking system may link a plurality of visually scannable codes to the first visually scannable code. In particular, the tracking system may determine that the first action includes a plurality of sub-actions. Then, the tracking system may generate a corresponding visually scannable code for each sub-action of the plurality of sub-actions. Furthermore, the tracking system may link each corresponding visually scannable code to the first visually scannable code. For example, the tracking system may determine the first routine includes three exercises. The tracking system may then generate three QR codes. Each QR code corresponds to one exercise. After generating all three QR codes, the tracking system links the QR codes together to the first QR code using the user identifier.

In some embodiments, the tracking system may embed a link into the first visually scannable code. In particular, the tracking system may encode the first action data into a parameter string representing the first action, the first operator identifier, and a user identifier associated with the user. The tracking system may embed the parameter string into the first visually scannable code. For example, the first action data may refer to a name for the routine. The first operator identifier may refer to the name of the trainer. For example, the tracking system may assign an alphanumeric string to each trainer, athlete, and action. The user identifier may refer to the alphanumeric string associated with the athlete, another alphanumeric string for the trainer, and the third alphanumeric string for one or more actions. Therefore, the tracking system may generate a string adding three alphanumeric strings. Furthermore, the tracking system may generate a link (e.g., to an application) for the first QR code. The link may include the string enabling access to the application.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

BRIEF DESCRIPTION OF THE DRAWINGS

FIG. 2 illustrates a data structure of a request to generate a visually scannable code, in accordance with one or more embodiments.

DETAILED DESCRIPTION OF THE DRAWINGS

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Figure 1:
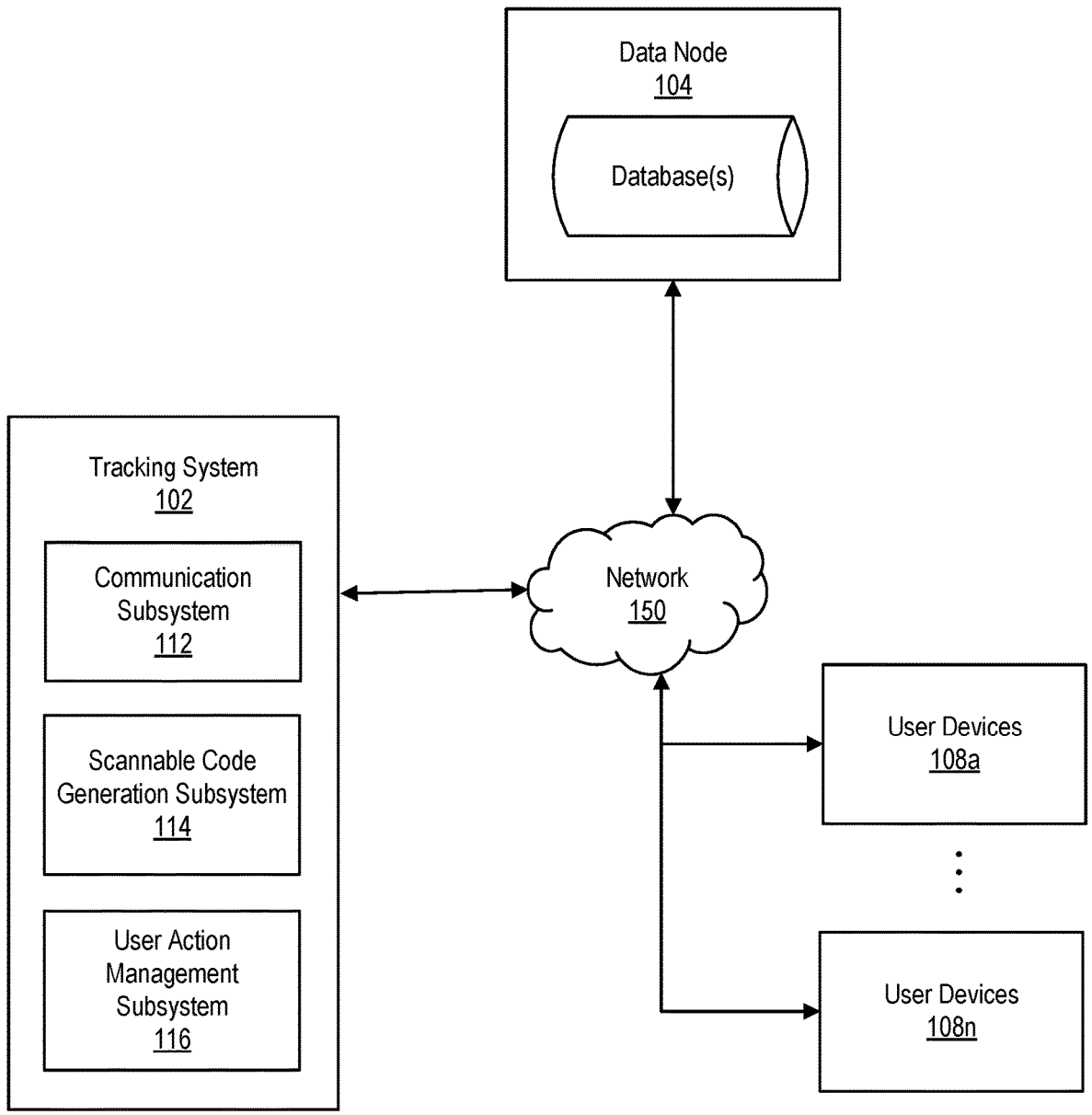
FIG. 1 shows an illustrative diagram for tracking user actions using visually scannable codes, in accordance with one or more embodiments.

FIG. 1 shows an example of an environment 100 for tracking user actions using visually scannable codes. Environment 100 includes tracking system 102, data node 104, and user devices 108a-108n. Tracking system 102 may execute instructions for tracking user actions using visually scannable codes. Tracking system 102 may include software, hardware, or a combination of the two. For example, tracking system 102 may be hosted on a physical server or a virtual server that is running on a physical computer system. In some embodiments, tracking system 102 may be configured on a user device (e.g., a laptop computer, a smartphone, a desktop computer, an electronic tablet, or another suitable user device).

Data node 104 may store various data, including action data, operator data, visually scannable codes, and/or other suitable data. Data node 104 may include software, hardware, or a combination of the two. For example, data node 104 may be a physical server or a virtual server that is running on a physical computer system. In some embodiments, tracking system 102 and data node 104 may reside on the same hardware and/or the same virtual server/computing device. Network 150 may be a local area network (LAN), a wide area network (WAN) such as the Internet, or a combination of the two.

User devices 108a-108n may include any suitable end-user computing devices (e.g., desktop computers, laptops, electronic tablets, smartphones, and/or other computing devices used by end users) capable of transmitting and receiving data such as requests and/or transactions.

Tracking system 102 may receive data from user devices 108a-108n using communication subsystem 112. Communication subsystem 112 may include software components, hardware components, or a combination of both. For example, communication subsystem 112 may include a network card (e.g., a wireless network card and/or a wired network card) that is associated with software to drive the card. In some embodiments, communication subsystem 112 may include a communication module (e.g., including hardware such as a network card and software to drive that network card). Communication subsystem 112 may receive and transmit data. For example, communication subsystem 112 may transmit a command to display the visually scannable code. In some embodiments, communication subsystem 112 may transmit a command to data node 104 to store the visually scannable codes. In some embodiments, the communication subsystem 112 may receive requests for generating visually scannable codes. In particular, communication subsystem 112 may receive a first request to generate a first visually scannable code encoding a first action associated with both a user and a first operator. The first request may include first action data describing the first action. In addition to using tracking system 102 to track training routines for athletes, in some embodiments, the system described herein may be used in a vehicle dealership (e.g., for selling cars, trucks, boats, and/or other vehicles) setting where service agents (e.g., operators) may perform tasks or actions related to users (customers). For example, tracking system 102 may receive a request from a service agent (e.g., operator) from his or her laptop or smartphone to generate a QR code in response to the service agent interacting with a customer. The interaction may include one or more actions such as showing the customer one or more vehicles within a dealership and/or taking the customer for a test drive in one or more vehicles. Components of the request are described further herein with references to FIG. 2. Although the tracking system and associated components are described herein in relation to tracking athletes' training routines or tracking customers of a vehicle dealership, the tracking system may be used in other settings to keep track of multiple operators interacting with multiple users.

In some embodiments, communication subsystem 112 may receive a first request to generate a first visually scannable code that encodes data related to the first operator. For example, communication subsystem 112 may receive a request to generate a QR code for the first operator. The QR code may be unique to the first operator and may identify the first operator. In some embodiments, the first visually scannable code may identify a user. For example, the first operator may request that a QR code is generated for the user. The QR code may be unique to the particular user and may identify that user. In yet some embodiments, the first visually scannable code may be generated for a pair of the first operator and the user. For example, a request may be instructing the system to generate a QR code that is unique to a pair that includes the first operator and the user.

FIG. 2 illustrates a data structure 200 of a request to generate a visually scannable code. Data structure 200 may include action data 202, and operator identifier 204. For example, the action data may refer to any data that describes the interaction between the service agent and the customer. For instance, the action may refer to a customer viewing a vehicle. The action data may refer to data such as the vehicle model the user viewed as well as user details such as their name and number. In some embodiments, action data may include multiple interactions such as the user both viewing and test driving the vehicle. Operator identifier 204 may include an identifier for the service agent's account. Therefore, tracking system 102 may receive a request from a user device to generate a QR code based on viewing a vehicle. As described herein, tracking system 102 may receive the request in a form of data structure 200, the data structure including action data 202 and operator identifier 204. In some embodiments, the request may be received from a user device (e.g., user device of user devices 108a-108n) via communication subsystem 112. Although FIG. 2 illustrates a data structure that includes action data, the visually scannable code may be generate for an operator. Accordingly, the data structure may include the visually scannable code, an operator identifier associated with a corresponding operator, and/or other data associated with the operator. In some embodiments, the visually scannable code may identify a user and thus, the data structure may include the visually scannable code, a user identifier, and/or other user data.

In some embodiments, the first request may include other information that may enable tracking system 102 to identify an operator associated with the request. In particular, the first request may include a first operator visually scannable code. Tracking system 102 may then determine a first operator identifier (e.g., an identifier associated with the first operator) using the first operator visually scannable code. For example, each service agent (e.g., operator) may be associated with a unique QR code. Each QR code may be unique to a corresponding service agent and may encode metadata information related to the agent's profile, dealership, and/or other relevant metadata. The QR code may be stored in a database and associated with the agent's profile. The agent's profile may include data associated with the agent such as sales information, action information, associated customers, and/or other suitable data. By storing and aggregating this information, tracking system 102 may be able to improve sales attribution accuracy by precisely identifying the service agent or service agents that contributed to each sale.

In some embodiments, scannable new codes may be generated using scannable code generation subsystem 114 that may include software components, hardware components, or a combination of both. For example, scannable code generation subsystem 114 may include software components that access and/or execute program instructions to generate scannable codes. For instance, scannable code generation subsystem 114 may include a QR code generator. Thus, scannable code generation subsystem 114 may generate a visually scannable code. In particular, in response to the first request, scannable code generation subsystem 114 may generate the first visually scannable code and store the first action data, a first operator identifier of the first operator, and the first visually scannable code. The first visually scannable code may embed an identifier that enables retrieving the first action data and second action data associated with the user. In some embodiments, the visually scannable code may be independent from the action data and may be associated with a first operator, the user, and/or with both.

In some embodiments, scannable code generation subsystem 114 may generate a QR code in response to the request received from the service agent. The QR code may include a link that enables displaying the first and second action data. In some embodiments, scannable code generation subsystem 114 may call an Application Programming Interface (API) to generate a unique QR code based on the service agent's information. The API (which may be A REST or Web services API) may provide a decoupled interface to data and/or functionality to the user device (e.g., a user device of user devices 108a-108n). The API may provide a common, language-agnostic way of interacting with any application. Web services APIs offer a well-defined contract, called WSDL, that describes the services in terms of its operations and the data types used to exchange information. REST APIs do not typically have this contract; instead, they are documented with client libraries for most common languages, including Ruby, Java, PHP, and JavaScript. SOAP Web services have traditionally been adopted in the enterprise for publishing internal services, as well as for exchanging information with partners in B2B transactions. For example, the scannable code generation subsystem 114 may transmit customization parameters to the API to ensure the QR code is unique to each service agent. Communication subsystem 112 may pass at least a portion of the data included in the request, or a pointer to the data in memory, to scannable code generation subsystem 114. Components of the QR code are described further herein with references to FIG. 3. In some embodiments, the visually scannable code may be used to retrieve information related to the first operator, the user, and/or the combination of both.

Figure 3:
FIG. 3 illustrates a data structure for storing a visually scannable code, in accordance with one or more embodiments.

FIG. 3 illustrates a data structure 300 for storing visually scannable codes. Data structure 300 may include action data 302, operator identifier 304, and visually scannable code 206. For example, each time a service agent transmits a request to generate a QR code to store the customer interaction (e.g., an action indicating that a test drive was performed), scannable code generation subsystem 114 may generate and store a corresponding QR code. In some embodiments, action data 302 may include the same data as action data 202. For instance, the action data may refer to data such as the vehicle model the customer viewed as well as customer details such as customer's name, email address, phone number, etc. In some embodiments, operator identifier 304 may include the same data as operator identifier 204. For instance, the tracking system may determine that more than one service agent assisted the customer. Therefore, operator identifier 304 may store more than one operator identifier. In some embodiments, tracking system 102 may store data structure 300 on data node 104.

When more activities associated with a user (e.g., a customer) are performed by the same operator or other operators (e.g., services agents), tracking system 102 may receive another request or multiple requests to generate a second visually scannable (e.g., via code via the communication subsystem 112). In particular, tracking system 102 may receive a second request to generate a second visually scannable code representing a second action (e.g., action data 202) associated with both the user and a second operator. The second request may include the second action data describing the second action. For example, tracking system 102 may receive a second request to generate a new QR code for the customer and a service agent for a second action. For instance, the second action may refer to the customer coming into the dealership after the test drive (e.g., first action). The customer may be visiting to express interest in buying the same car that they took for a test drive or a different car. In another example, if a customer test drove multiple cars, the customer may be coming in to make a purchase or perform another action related to one of the cars. In response to speaking with the customer, the service agent may request to generate a new QR code. In some embodiments, the service agent for the first action may be the same service agent for the second action.

Tracking system 102 may then generate the second visually scannable code. In particular, in response to the second request, tracking system 102 may generate (e.g., using scannable code generation subsystem 114) the second visually scannable code (e.g., visually scannable code 306) and store the second action data (e.g., action data 302), a second operator identifier of the second operator (e.g., operator identifier 304), and the second visually scannable code (e.g., in a database on data node 104). The second visually scannable code may embed an identifier that enables retrieving the first action data and the second action data. For example, the second request may indicate that the customer is ready to purchase the vehicle within the related action data (e.g., action data 202). In response, the QR code generated (e.g., visually scannable code 306) may include a link to a pre-qualification website. The pre-qualification website may collect customer information and initiate the customer pre-qualification process. During the pre-qualification process, the system may generate a call to an API for creating a data structure representing the customer within the pre-qualification process. The customer data (e.g., action data 302), the service agent information (e.g., operator identifier 304), and the associated QR code from the second request may be passed to a customer relationship management (CRM) system. The service agent information may also flow to the CRM system, thereby attributing the creation action to the specific service agent.

Figure 4:
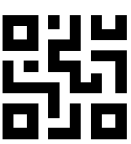
FIG. 4 illustrates a data structure of a database entry, in accordance with one or more embodiments.

In some embodiments, when storing the first action data, tracking system 102 may store the first action data in a first database entry. Components of the database entry are described further herein with references to FIG. 4. FIG. 4 illustrates a data structure 400 of a database entry. Data structure 400 may include user identifier 402, action data 404, operator identifier 406, and visually scannable code 408. In particular, tracking system 102 when storing the first action data (e.g., action data 302) may store the first action data (e.g., action data 404), the first operator identifier (e.g., operator identifier 406), and the first visually scannable code (e.g., visually scannable code 408) in a first database entry (e.g., data structure 400) corresponding to the user (e.g., user identifier 402). Likewise, tracking system 102 when storing the second action data (e.g., action data 202 or action data 302) may store the second action data (e.g., action data 404), the second operator identifier (e.g., operator identifier 406), and the second visually scannable code (e.g., visually scannable code 408) in a second database entry corresponding to the user. In some embodiments, tracking system 102 may link the first database entry and the second database entry. In particular, tracking system 102 may link the first database entry and the second database entry based on a user identifier associated with the user. For example, when storing the first and second actions in a database, tracking system 102 may generate a user identifier (e.g., user identifier 402). Therefore, when a visually scannable code is scanned, all entries associated with the user identifier (e.g., user identifier 402) corresponding to a scanned code may be retrieved.

When the visually scannable codes are scanned, data retrieval actions may be performed by user action management subsystem 116. User action management subsystem 116 may include software components, hardware components, or a combination of both. For example, user action management subsystem 116 may include software components that access and/or execute programs to store and search for visually scannable codes (e.g., QR codes). Thus, tracking system 102 may generate for display the first action data and the second action data using user action management subsystem 116. In particular, in response to determining that the first visually scannable code has been detected or the second visually scannable code has been detected, tracking system 102 may generate for display the first action data and the second action data. For example, in response to detecting that a customer has scanned a QR code, tracking system 102 may transmit a command to the user device associated with the customer to display the actions associated with the customer.

In some embodiments, tracking system 102 may generate a data file that enables displaying action data. In particular, tracking system 102 may generate a data file that includes interpretable code (e.g., Java code or another type of interpretable code). The interpretable code, when interpreted by an interpreter (e.g., Java interpreter), may cause generating for display the first action data, the second action data, and user data associated with the user. Tracking system 102 may store the interpretable code as a file to be retrieved by scanning the first visually scannable code or the second visually scannable code. For example, each QR code may link to a deep link that contains a Universal Resource Locator (URL) for a microsite. A deep link may refer to a specified custom URL that enables retrieving a particular sub-page of a website. The deep link may be generated based on the action data. The deep link may include a minified URL for a website with a unique code that links to metadata information such as action data. The tracking system 102 may store this deep link. Therefore, when the user scans the QR codes, the user device can direct the user to the intended URL.

In some embodiments, tracking system 102 may use a deep linking service to store and retrieve information associated with different visually scannable codes. In particular, the deep linking services may include two tables. The configuration table may contain information the type of deep link, associated metadata, template type, and template metadata. The URL table may contain information about each URL, associated deep link type ID, link data, interaction ID, template ID, and other suitable data. When the visually scannable code is scanned, the scan may be fed to the microsite which may read a query parameter associated with the visually scannable code and may make a call to the deep state link service to retrieve all metadata associated with the visually scannable code. If the deep link type is "prequal," the microsite may load the corresponding Pre-qualification interface and pass the deep link data to this interface. In some embodiments, Prequal may be associated with a pre-qualification process, which may indicate whether a user is qualified for financing of a vehicle. That is, the first operator and the second operator may be customer service agents while the user may be a customer.

The Pre-qualification interface may be loaded within the microsite and may be responsible for collecting customer information and initiating the customer pre-qualification process. During the pre-qualification process, the system may make a call to the Leads API for creating the lead. Along with the customer data, the sales agent information/code may also be passed. The Leads API may further create the lead in the dealer Client Relationship Management (CRM) system by sending the lead information in a specifically formatted email. The sale agent information may also flow to the CRM, thereby attributing the lead creation to the specific sales agent.

In some embodiments, the metadata associated with the deep link may contain details about loading the Pre-qualification interface and passing the specific customer service agent's special code. The microsite may get all the data and load the Pre-qualification interface and pass the metadata retrieved from the deep link service along with the sales agent data. This solution may provide a seamless experience for moving from online to the dealership and may enhance the walk-in customer experience by providing tools for self-servicing. The solution may also accelerate the car buying process when walking into the dealership and ensure that the lead creation in the dealer navigator and CRM may be attributed to correct agents.

In some embodiments, tracking system 102 may determine that the user completed a final action via user action management subsystem 116 and update operator records based on the determination of completion. In particular, tracking system 102 may determine that the user completed a final action. Based on determining that the user completed the final action, tracking system 102 may retrieve the first action data and the second action data. Tracking system 102 may determine, based on the first action data and the second action data, a first operator visually scannable code and a second operator visually scannable code, the first operator identifier, and the second operator identifier. Tracking system 102 may update, based on the first action data and the second action data, a first record associated with the first operator and a second record associated with the second operator.

For example, a final action may refer to the customer purchasing the car. Tracking system 102 may determine the customer has purchased the car by receiving an indication that the purchase transaction has been completed. In response to determining the sale is complete, tracking system 102 may search for related user actions. For example, the user may have shown interest in the car and spoken to a service agent on a prior day before purchasing the car. On another day, the user may have taken the car for a test-drive with another service agent. Tracking system 102 may retrieve the action data and the database entries related to these two user actions. After retrieving the action data, tracking system 102 may retrieve the related operator identifier or operator identifiers and the associated operator visually scannable code or codes. In response to determining there was more than one service agent associated with the transaction, tracking system 102 may update the record of the sale into two different records. That is, tracking system 102 may assign credit to the two service agents based on the actions performed. By doing so, tracking system 102 may provide transparency into the sales attribution process, allowing dealerships to monitor sales activity and identify areas for improvement.

In some embodiments, tracking system 102 may update the first record and the second record. In particular, when updating the first record and the second record, tracking system 102 may add a first flag to the first record indicating a first portion of the final action. The first portion may be determined based on the first action data. Tracking system 102 may add a second flag to the second record indicating a second portion of the final action. The second portion may be determined based on the second action data. Components of updating the first record are described further herein with reference to FIG. 5.

Figure 5:
FIG. 5 illustrates a data structure used for flagging a visually scannable code, in accordance with one or more embodiments.
Figure 5:

FIG. 5 illustrates a data structure 500 used for flagging a visually scannable code. Data structure 500 may include user identifier 502, action data 504, operator identifier 506, visually scannable code 508, first flag 510, and second flag 512. For example, user identifier 502 may refer to the identifier for a user account for the customer. Action data 504 may refer to the details related to the user action. For example, action data 504 may include customer information and details related to the car the customer was interested in purchasing. In some embodiments, action data 504 may include the same data as action data 404. Operator identifier 506 may refer to the identifier for the service agent and their profile. Visually scannable code 508 may refer to the generated QR code for each action data.

In some embodiments, tracking system 102 may determine an update process for the records based on actions corresponding to each operator. That is, tracking system 102 may apportion credit based on the actions that each service agent performed. In particular, tracking system 102 may retrieve a plurality of action identifiers from the first action data and the second action data. Tracking system 102 may determine a ratio between a first set of the plurality of action identifiers and a second set of the plurality of action identifiers. The first set may correspond to the first action data, and the second set may correspond to the second action data. For example, tracking system 102 may retrieve the actions corresponding to each service agent and determine a ratio of these actions (e.g., 3 to 2 or 1 to 2). In some embodiments, the actions may have weights; thus, tracking system 102 may determine a weighted ratio. Thus, tracking system 102 may then generate the first portion based on the ratio.

For example, in response to determining two service agents assisted the customer with the purchase, tracking system 102 may determine the ratio between the two service agents. Tracking system 102 may search for a set of actions related to the customer. In response to finding multiple actions, tracking system 102 may divide the actions into two portions. Each portion corresponds to a specific service agent. After that, tracking system 102 may flag all database entries with the first service agent with the first flag 510 and flag all database entries with the second service agent with the second flag 512. By doing so, the system may accurately attribute sales to the correct service agent, thereby eliminating any ambiguity and ensuring that each service agent is rewarded for their hard work.

In some embodiments, tracking system 102 may assign a visually scannable code to a new user and update each database entry. In particular, tracking system 102 may receive, within the first request, an indication that the user is a new user. Tracking system 102 may assign a new visually scannable code to the user. Tracking system 102 may then update each database entry associated with the user with the new visually scannable code. For example, the service agent may note that a customer is a new user in the action data 202 in the first request. In response, tracking system 102 may generate a new QR code for the new user. For instance, the new QR code may include a link that allows the customer to provide their information. Therefore, tracking system 102 may update any previous database with the new QR code.

In some embodiments, tracking system 102 may link each corresponding visually scannable code to the first visually scannable code. In particular, tracking system 102 may determine that the first action includes a plurality of sub-actions. Tracking system 102 may generate a corresponding visually scannable code for each sub-action of the plurality of sub-actions. Tracking system 102 may link each corresponding visually scannable code to the first visually scannable code. For example, the first action may refer to the customer taking a test-drive. The customer may have called and scheduled the test-drive before visiting the dealership. Therefore, two sub-actions occurred for the first action. Tracking system 102 may link each sub-action with each other.

In some embodiments, tracking system 102 may encode the first action data into the first visually scannable code. In particular, tracking system 102 may encode the first action data into a parameter string representing the first action, the first operator identifier, and a user identifier associated with the user. Tracking system 102 may embed the parameter string into the first visually scannable code. For example, an alphanumeric string may be associated with the customer as a user identifier. A second alphanumeric string may be used for the service agent. The third alphanumeric string may be used for one or more actions. Therefore, the tracking system may generate a string concatenating the three alphanumeric strings. Furthermore, the tracking system may generate a link (e.g., to an application) for the first QR code. The link may include the string enabling access to the application.

Computing Environment

Figure 6:
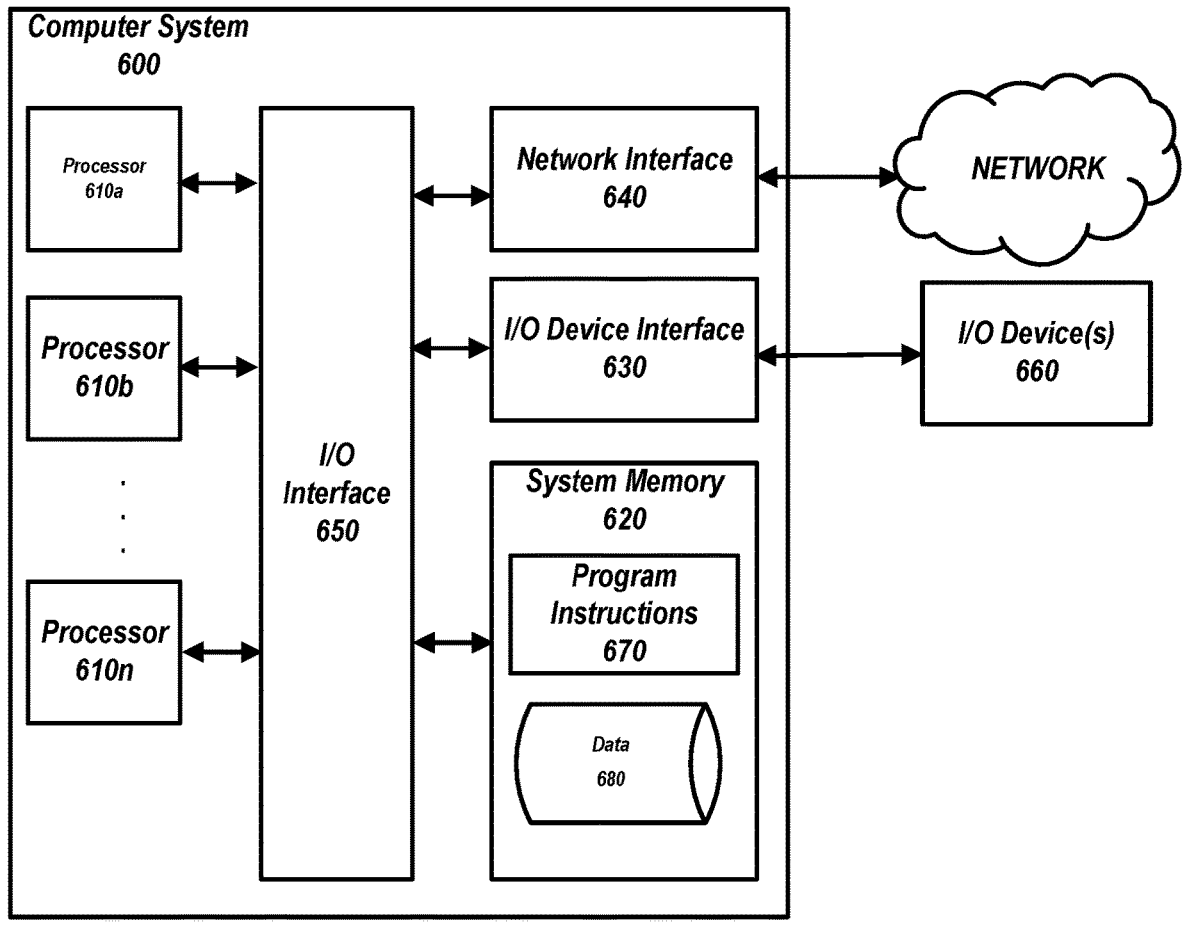
FIG. 6 illustrates a computing device, in accordance with one or more embodiments.

FIG. 6 shows an example computing system that may be used in accordance with some embodiments of this disclosure. In some instances, computing system 600 is referred to as a computer system 600. A person skilled in the art would understand that those terms may be used interchangeably. The components of FIG. 6 may be used to perform some or all operations discussed in relation to FIGS. 1-5. Furthermore, various portions of the systems and methods described herein may include or be executed on one or more computer systems similar to computing system 600. Further, processes and modules described herein may be executed by one or more processing systems similar to that of computing system 600.

Computing system 600 may include one or more processors (e.g., processors 610a-610n) coupled to system memory 620, an input/output (I/O) device interface 630, and a network interface 640 via an I/O interface 650. A processor may include a single processor, or a plurality of processors (e.g., distributed processors). A processor may be any suitable processor capable of executing or otherwise performing instructions. A processor may include a central processing unit (CPU) that carries out program instructions to perform the arithmetical, logical, and I/O operations of computing system 600. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 620). Computing system 600 may be a uni-processor system including one processor (e.g., processor 610a) or a multi-processor system including any number of suitable processors (e.g., processors 610a-610n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field-programmable gate array) or an ASIC (application-specific integrated circuit). Computing system 600 may include a plurality of computing devices (e.g., distributed computer systems) to implement various processing functions.

I/O device interface 630 may provide an interface for connection of one or more I/O devices 660 to computer system 600. I/O devices may include devices that receive input (e.g., from a user) or output information (e.g., to a user). I/O devices 660 may include, for example, a graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 660 may be connected to computer system 600 through a wired or wireless connection. I/O devices 660 may be connected to computer system 600 from a remote location. I/O devices 660 located on remote computer systems, for example, may be connected to computer system 600 via a network and a network interface 640.

Network interface 640 may include a network adapter that provides for connection of computer system 600 to a network. Network interface 640 may facilitate data exchange between computer system 600 and other devices connected to the network. Network interface 640 may support wired or wireless communication. The network may include an electronic communication network such as the Internet, a LAN, a WAN, a cellular communications network, or the like.

System memory 620 may be configured to store program instructions 670 or data 680. Program instructions 670 may be executable by a processor (e.g., one or more of processors 610a-610n) to implement one or more embodiments of the present techniques. Program instructions 670 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program may be deployed to be executed on one or more computer processors located locally at one site or distributed across multiple remote sites and interconnected by a communication network.

System memory 620 may include a tangible program carrier having program instructions stored thereon. A tangible program carrier may include a non-transitory, computer-readable storage medium. A non-transitory, computer-readable storage medium may include a machine-readable storage device, a machine-readable storage substrate, a memory device, or any combination thereof. A non-transitory, computer-readable storage medium may include non-volatile memory (e.g., flash memory, ROM, PROM, EPROM, EEPROM), volatile memory (e.g., random-access memory (RAM), static random-access memory (SRAM), synchronous dynamic RAM (SDRAM)), bulk storage memory (e.g., CD-ROM and/or DVD-ROM, hard drives), or the like. System memory 620 may include a non-transitory, computer-readable storage medium that may have program instructions stored thereon that are executable by a computer processor (e.g., one or more of processors 610a-610n) to cause the subject matter and the functional operations described herein. A memory (e.g., system memory 620) may include a single memory device and/or a plurality of memory devices (e.g., distributed memory devices).

I/O interface 650 may be configured to coordinate I/O traffic between processors 610a-610n, system memory 620, network interface 640, I/O devices 660, and/or other peripheral devices. I/O interface 650 may perform protocol, timing, or other data transformations to convert data signals from one component (e.g., system memory 620) into a format suitable for use by another component (e.g., processors 610a-610n). I/O interface 650 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 600 or multiple computer systems 600 configured to host different portions or instances of embodiments. Multiple computer systems 600 may provide for parallel or sequential processing/execution of one or more portions of the techniques described herein.

Those skilled in the art will appreciate that computer system 600 is merely illustrative and is not intended to limit the scope of the techniques described herein. Computer system 600 may include any combination of devices or software that may perform or otherwise provide for the performance of the techniques described herein. For example, computer system 600 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, a Global Positioning System (GPS), or the like. Computer system 600 may also be connected to other devices that are not illustrated or may operate as a stand-alone system. In addition, the functionality provided by the illustrated components may, in some embodiments, be combined in fewer components or distributed in additional components. Similarly, in some embodiments, the functionality of some of the illustrated components may not be provided, or other additional functionality may be available.

Figure 7:
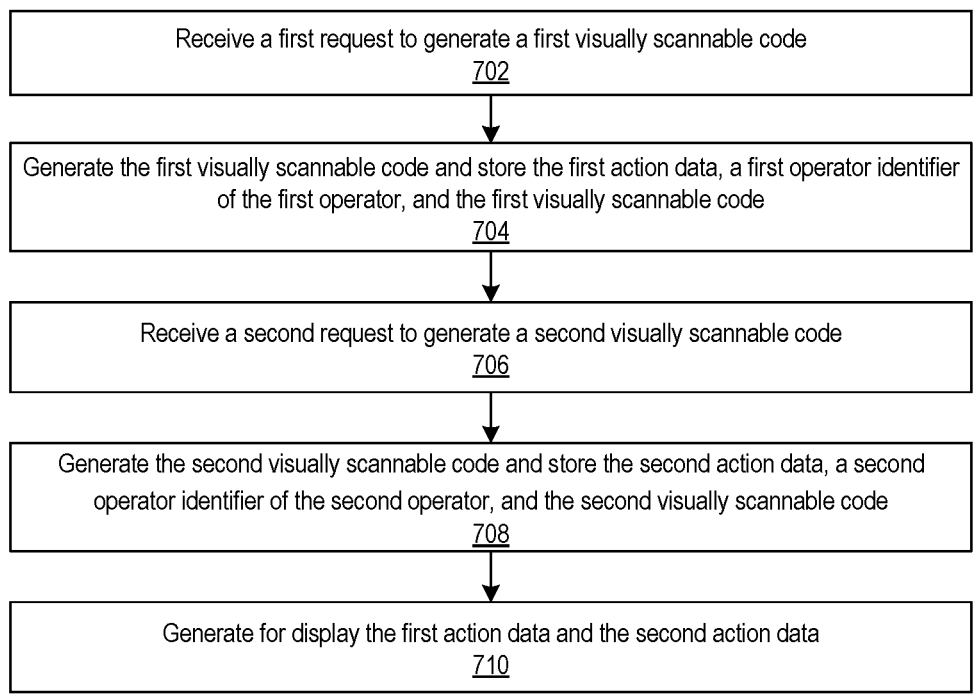
FIG. 7 shows a flowchart of the steps involved in tracking user actions using visually scannable codes, in accordance with one or more embodiments.

FIG. 7 shows a flowchart of the steps involved in tracking user actions using visually scannable codes, in accordance with one or more embodiments. For example, the system may use process 700 (e.g., as implemented on one or more system components described above) in order to track user actions using QR codes.

At 702, tracking system 102 (e.g., using one or more components described above) receives a first request to generate a first visually scannable code. For example, the tracking system 102 may receive a first request to generate a first visually scannable code encoding a first action associated with both a user and a first operator. The first request may include first action data describing the first action. Tracking system 102 may use I/O device interface 630, I/O device 660, and network interface 640.

At 704, tracking system 102 (e.g., using one or more components described above) generates the first visually scannable code and stores the first action data, a first operator identifier of the first operator, and the first visually scannable code. For example, in response to the first request, tracking system 102 may generate the first visually scannable code and store the first action data, a first operator identifier of the first operator, and the first visually scannable code. The first visually scannable code embeds an identifier that enables retrieving the first action data and second action data associated with the user. Tracking system 102 may use I/O device interface 630, I/O device 660, network interface 640, system memory 620, data 680, and processors 610a, 610b, and/or 610n.

At 706, tracking system 102 (e.g., using one or more components described above) receives a second request to generate a second visually scannable code. For example, tracking system 102 may receive a second request to generate a second visually scannable code representing a second action associated with both the user and a second operator. The second request may include the second action data describing the second action. Tracking system 102 may use I/O device interface 630, I/O device 660, and network interface 640.

At 708, tracking system 102 (e.g., using one or more components described above) generates the second visually scannable code and stores the second action data, a second operator identifier of the second operator, and the second visually scannable code. For example, in response to the second request, tracking system 102 may generate the second visually scannable code and store the second action data, a second operator identifier of the second operator, and the second visually scannable code. The second visually scannable code embeds the identifier that enables retrieving the first action data and the second action data. Tracking system 102 may use I/O device interface 630, I/O device 660, network interface 640, system memory 620, data 680 and processors 610a, 610b, and/or 610n.

At 710, tracking system 102 (e.g., using one or more components described above) generates for display the first action data and the second action data. For example, in response to determining that the first visually scannable code has been detected or the second visually scannable code has been detected, tracking system 102 may generate for display the first action data and the second action data. Tracking system 102 may use I/O device interface 630, I/O device 660, and network interface 640.

It is contemplated that the steps or descriptions of FIG. 7 may be used with any other embodiment of this disclosure. In addition, the steps and descriptions described in relation to FIG. 7 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 7.

The above-described embodiments of the present disclosure are presented for purposes of illustration and not of limitation, and the present disclosure is limited only by the claims that follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method, the method comprising: receiving, from a first operator, a first request to generate a first QR code representing one or more first actions associated with both a user and the first operator, wherein the first request comprises (1) first action data describing the one or more first actions and (2) a first operator identifier corresponding to the first operator; in response to the first request, generating the first QR code and storing the first action data, the first operator identifier, and the first QR code in a first database entry corresponding to the user, wherein the first QR code embeds an identifier that enables retrieving the first action data and second action data associated with the user; receiving, from a second operator, a second request to generate a second QR code representing one or more second actions associated with both the user and the second operator, wherein the second request comprises (1) the second action data describing the one or more second actions associated with the user, and (2) a second operator identifier corresponding to the second operator; in response to the second request, generating the second QR code and storing the second action data, the second operator identifier, and the second QR code in a second database entry corresponding to the user, wherein the second QR code embeds the identifier that enables retrieving the first action data and the second action data; in response to determining that the first QR code has been detected or the second QR code has been detected, generating a data structure comprising the first action data, the second action data, and user data associated with the user; and generating for display the data structure on a computing device that scanned the first QR code or the second QR code.

2. A method, the method comprising: receiving a first request to generate a first visually scannable code encoding a first action associated with both a user and a first operator, wherein the first request comprises first action data describing the first action; in response to the first request, generating the first visually scannable code and storing the first action data, a first operator identifier of the first operator, and the first visually scannable code, wherein the first visually scannable code embeds an identifier that enables retrieving the first action data and second action data associated with the user; receiving a second request to generate a second visually scannable code representing a second action associated with both the user and a second operator, wherein the second request comprises the second action data describing the second action; in response to the second request, generating the second visually scannable code and storing the second action data, a second operator identifier of the second operator, and the second visually scannable code, wherein the second visually scannable code embeds the identifier that enables retrieving the first action data and the second action data; and in response to determining that the first visually scannable code has been detected or the second visually scannable code has been detected, generating for display the first action data and the second action data.

3. A method comprising: in response to receiving a first request, generating a first visually scannable code encoding a first action associated with both a user and a first operator and storing first action data describing the first action, a first operator identifier of the first operator, and the first visually scannable code, wherein the first visually scannable code embeds an identifier that enables retrieving the first action data and second action data associated with the user; receiving a second request to generate a second visually scannable code representing a second action associated with both the user and a second operator, wherein the second request comprises the second action data describing the second action; in response to the second request, generating the second visually scannable code and storing the second action data, a second operator identifier of the second operator, and the second visually scannable code, wherein the second visually scannable code embeds the identifier that enables retrieving the first action data and the second action data; and in response to determining that the first visually scannable code has been detected or the second visually scannable code has been detected, generating for display the first action data and the second action data.

4. The method of any one of the preceding embodiments, wherein generating for display the first action data and the second action data comprises: generating a data file comprising interpretable code, wherein the interpretable code when interpreted causes generating for display the first action data, the second action data, and user data associated with the user; and storing the interpretable code as a file to be retrieved by scanning the first visually scannable code or the second visually scannable code.

5. The method of any one of the preceding embodiments, wherein the first request comprises a first operator visually scannable code, and wherein the first operator identifier is determined using the first operator visually scannable code.

6. The method of any one of the preceding embodiments, wherein storing the first action data comprises storing the first action data, the first operator identifier, and the first visually scannable code in a first database entry corresponding to the user, and storing the second action data comprises storing the second action data, the second operator identifier, and the second visually scannable code in a second database entry corresponding to the user.

7. The method of any one of the preceding embodiments, further comprising linking the first database entry and the second database entry based on a user identifier associated with the user.

8 The method of any one of the preceding embodiments, further comprising: determining that the user completed a final action; based on determining that the user completed the final action, retrieving the first action data and the second action data; determining, based on the first action data and the second action data, a first operator visually scannable code, and a second operator visually scannable code, the first operator identifier, and the second operator identifier; and updating, based on the first action data and the second action data, a first record associated with the first operator and a second record associated with the second operator.

9. The method of any one of the preceding embodiments, wherein updating the first record and the second record comprises: adding a first flag to the first record indicating a first portion of the final action, wherein the first portion is determined based on the first action data; and adding a second flag to the second record indicating a second portion of the final action, wherein the second portion is determined based on the second action data.

10. The method of any one of the preceding embodiments, wherein determining the first portion comprises: retrieving a plurality of action identifiers from the first action data and the second action data; determining a ratio between a first set of the plurality of action identifiers and a second set of the plurality of action identifiers, wherein the first set corresponds to the first action data and the second set corresponds to the second action data; and generating the first portion based on the ratio.

11. The method of any one of the preceding embodiments, further comprising: determining that the first action comprises a plurality of sub-actions; generating a corresponding visually scannable code for each sub-action of the plurality of sub-actions; and linking each corresponding visually scannable code to the first visually scannable code.

12. The method of any one of the preceding embodiments, further comprising: receiving, within the first request, an indication that the user is a new user; assigning a new visually scannable code to the user; and updating each database entry associated with the user with the new visually scannable code.

13. The method of any one of the preceding embodiments, further comprising: encoding the first action data into a parameter string representing the first action, the first operator identifier, and a user identifier associated with the user; and embedding the parameter string into the first visually scannable code.

14. A tangible, non-transitory, machine-readable medium storing instructions that, when executed by a data processing apparatus, cause the data processing apparatus to perform operations comprising those of any of embodiments 1-13.

15. A system comprising one or more processors; and memory storing instructions that, when executed by the processors, cause the processors to effectuate operations comprising those of any of embodiments 1-13.

16. A system comprising means for performing any of embodiments 1-13.

What is claimed is:

1. A method for tracking user actions using visually scannable codes, the method comprising:
receiving a first request to generate a first visually scannable code encoding a first action associated with both a user and a first operator, wherein the first request comprises first action data describing the first action;
in response to the first request, generating the first visually scannable code and storing, in a database, the first action data and a first operator identifier of the first operator in connection with the first visually scannable code, wherein the first visually scannable code embeds an identifier that enables retrieving the first action data and second action data associated with the user;
receiving a second request to generate a second visually scannable code representing a second action associated with both the user and a second operator, wherein the second request comprises the second action data describing the second action;
in response to the second request, generating the second visually scannable code and storing, in a database, the second action data and a second operator identifier of the second operator in connection with the second visually scannable code, wherein the second visually scannable code embeds the identifier that enables retrieving the first action data and the second action data;
in response to determining that the first visually scannable code has been detected or the second visually scannable code has been detected, generating for display the first action data and the second action data;
determining that the user completed a final action; and
in response to determining that the user completed the final action, retrieving the first action data and the second action data and updating, based on the first action data and the second action data, a first record associated with the first operator and a second record associated with the second operator, wherein updating the first record and the second record comprises:
adding a first flag to the first record indicating a first portion of the final action, wherein the first portion is determined based on the first action data; and
adding a second flag to the second record indicating a second portion of the final action, wherein the second portion is determined based on the second action data.

2. The method of claim 1, wherein generating for display the first action data and the second action data comprises:
generating a data file comprising interpretable code, wherein the interpretable code, when interpreted, causes generating for display the first action data, the second action data, and user data associated with the user; and
storing the interpretable code as a file to be retrieved by scanning the first visually scannable code or the second visually scannable code.

3. The method of claim 1, wherein the first request comprises a first operator visually scannable code, and wherein the first operator identifier is determined using the first operator visually scannable code.

4. The method of claim 1, wherein storing the first action data comprises storing the first action data, the first operator identifier, and the first visually scannable code in a first database entry corresponding to the user, and storing the second action data comprises storing the second action data, the second operator identifier, and the second visually scannable code in a second database entry corresponding to the user.

5. The method of claim 4, further comprising linking the first database entry and the second database entry based on a user identifier associated with the user.

6. The method of claim 1, wherein updating the first record and the second record comprises: further comprising:
determining, based on the first action data and the second action data, a first operator visually scannable code, and a second operator visually scannable code, the first operator identifier, and the second operator identifier; and
updating, based on the determination of the first operator identifier and the second operator identifier, the first record associated with the first operator and the second record associated with the second operator.

7. The method of claim 1, further comprising:
retrieving a plurality of action identifiers from the first action data and the second action data;
determining a ratio between a first set of the plurality of action identifiers and a second set of the plurality of action identifiers, wherein the first set corresponds to the first action data and the second set corresponds to the second action data; and generating the first portion based on the ratio to update the first record.

8. The method of claim 1, further comprising:

determining that the first action comprises a plurality of sub-actions;

generating a corresponding visually scannable code for each sub-action of the plurality of sub-actions; and linking each corresponding visually scannable code to the first visually scannable code.

9. The method of claim 1, further comprising:

receiving, within the first request, an indication that the user is a new user;

assigning a new visually scannable code to the user; and updating each database entry associated with the user with the new visually scannable code.

10. The method of claim 1, further comprising:

encoding the first action data into a parameter string representing the first action, the first operator identifier, and a user identifier associated with the user; and embedding the parameter string into the first visually scannable code.

11. One or more non-transitory, computer-readable storage media storing instructions that, when executed by one or more processors, cause operations comprising:

in response to receiving a first request, generating a first visually scannable code encoding a first action associated with both a user and a first operator and storing first action data, describing the first action and a first operator identifier of the first operator in connection with the first visually scannable code, wherein the first visually scannable code embeds an identifier that enables retrieving the first action data and second action data associated with the user;

receiving a second request to generate a second visually scannable code representing a second action associated with both the user and a second operator, wherein the second request comprises the second action data describing the second action;

in response to the second request, generating the second visually scannable code and storing the second action data and a second operator identifier of the second operator in connection with the second visually scannable code, wherein the second visually scannable code embeds the identifier that enables retrieving the first action data and the second action data;

in response to determining that the first visually scannable code has been detected or the second visually scannable code has been detected, generating for display the first action data and the second action data; and in response to determining that the user completed a final action, updating, based on the first action data and the second action data, a first record associated with the first operator and a second record associated with the second operator, wherein updating the first record and the second record comprises:

adding a first flag to the first record indicating a first portion of the final action, wherein the first portion is determined based on the first action data; and adding a second flag to the second record indicating a second portion of the final action, wherein the second portion is determined based on the second action data.

12. The one or more non-transitory, computer-readable storage media of claim 11, wherein the instructions for generating for display the first action data and the second action data further cause the one or more processors to perform operations comprising:

generating a data file comprising interpretable code, wherein the interpretable code, when interpreted, causes generating for display the first action data, the second action data, and user data associated with the user; and storing the interpretable code as a file to be retrieved by scanning the first visually scannable code or the second visually scannable code.

13. The one or more non-transitory, computer-readable storage media of claim 11, wherein the first request comprises a first operator visually scannable code, and wherein the first operator identifier is determined using the first operator visually scannable code.

14. The one or more non-transitory, computer-readable storage media of claim 11, wherein the instructions for storing the first action data further causes the one or more processors to perform operations comprising storing the first action data, the first operator identifier, and the first visually scannable code in a first database entry corresponding to the user, and storing the second action data comprises storing the second action data, the second operator identifier, and the second visually scannable code in a second database entry corresponding to the user.

15. The one or more non-transitory, computer-readable storage media of claim 11, wherein updating the first record and the second record comprises:

determining, based on the first action data and the second action data, a first operator visually scannable code, and a second operator visually scannable code, the first operator identifier, and the second operator identifier; and updating, based on the determination of the first operator identifier and the second operator identifier, the first record associated with the first operator and the second record associated with the second operator.

16. The one or more non-transitory, computer-readable storage media of claim 11, wherein the instructions further cause the one or more processors to perform operations comprising:

retrieving a plurality of action identifiers from the first action data and the second action data;

determining a ratio between a first set of the plurality of action identifiers and a second set of the plurality of action identifiers, wherein the first set corresponds to the first action data and the second set corresponds to the second action data; and generating the first portion based on the ratio to update the first record.

17. The one or more non-transitory, computer-readable storage media of claim 11, wherein the instructions further cause the one or more processors to perform operations comprising:

encoding the first action data into a parameter string representing the first action, the first operator identifier, and a user identifier associated with the user; and embedding the parameter string into the first visually scannable code.

18. A system comprising:

one or more processors and non-transitory media storing instructions that, when executed by the one or more processors, cause operations comprising:

in response to receiving a first request, generating a first scannable code encoding a first action associated with both a user and a first operator and storing first action data, describing the first action, and a first operator identifier of the first operator in connection with the first scannable code, wherein the first scannable code embeds an identifier that enables retrieving the first action data and second action data associated with the user;

in response to receiving a second request to generate a second scannable code representing a second action (i) associated with both the user and a second operator and (ii) described by the second action data, generating the second scannable code and storing the second action data and a second operator identifier of the second operator in connection with the second scannable code, wherein the second scannable code embeds the identifier that enables retrieving the first action data and the second action data;

in response to determining that the first scannable code has been detected or the second scannable code has been detected, generating for display the first action data and the second action data; and in response to determining that the user completed a final action, updating, based on the first action data and the second action data, a first record associated with the first operator and a second record associated with the second operator, wherein updating the first record and the second record comprises:

adding a first flag to the first record indicating a first portion of the final action, wherein the first portion is determined based on the first action data; and adding a second flag to the second record indicating a second portion of the final action, wherein the second portion is determined based on the second action data.

19. The system of claim 18, wherein storing the first action data and the first operator identifier comprises, in response to receiving the first request, generating a first QR code representing the first action and storing, in a database, the first action data and the first operator identifier in connection with the first QR code, wherein the first QR code embeds the identifier that enables retrieving the first action data and the second action data.

* * * * *